US006813339B2

(12) United States Patent
Kracker et al.

(10) Patent No.: US 6,813,339 B2
(45) Date of Patent: Nov. 2, 2004

(54) TELECOMMUNICATIONS LINE TEST EXTENSION APPARATUS

(75) Inventors: Denis Joseph Kracker, Houston, TX (US); Michael Wayne Snider, Houston, TX (US)

(73) Assignee: SBC Technology Resources, INC, Austin, TX (US)

(*) Notice: Subject to any disclaimer, the term of this patent is extended or adjusted under 35 U.S.C. 154(b) by 340 days.

(21) Appl. No.: 10/151,482

(22) Filed: May 17, 2002

(65) Prior Publication Data

US 2003/0215062 A1 Nov. 20, 2003

(51) Int. Cl.[7] .................................................. H04M 1/24

(52) U.S. Cl. .......................... 379/25; 379/4; 379/27.07; 379/29.01

(58) Field of Search ............................ 379/25, 4, 1.01, 379/9, 9.06, 14.01, 15.01, 15.05, 19, 21, 22.04, 22.06, 22.07, 26.01, 27.07, 29.01; 324/66, 67

(56) References Cited

U.S. PATENT DOCUMENTS 4,001,525 A 1/1977 Edwards
4,799,251 A 1/1989 Smith et al.
4,843,620 A 6/1989 Hagedorn
5,025,466 A 6/1991 Hilligoss et al.
5,361,298 A 11/1994 Ruel et al.
5,422,929 A 6/1995 Hurst et al.
5,491,745 A 2/1996 Roeder
5,511,108 A 4/1996 Severt et al.
5,528,662 A 6/1996 Stephens
5,726,993 A 3/1998 Kelsey et al.
5,778,050 A 7/1998 Park, II
5,953,390 A 9/1999 Olson
5,956,385 A 9/1999 Soto et al.
6,201,853 B1 3/2001 Butler et al.
6,252,941 B1 6/2001 Daoud
6,253,060 B1 6/2001 Komara et al.
6,577,116 B2 * 6/2003 Wollert ....................... 324/133

* cited by examiner

*Primary Examiner*—Curtis Kuntz
*Assistant Examiner*—Barry W Taylor
(74) *Attorney, Agent, or Firm*—Cardinal Law Group

(57) ABSTRACT

An apparatus is provided for testing a communications line. The apparatus comprises a spool having at least eight terminals, and a length of wire wound on the spool. The wire has at least four subpairs of wires, each of which has opposite ends. A first end of each of the subpairs of wires is electrically connectable to the communications line, and a second end of each of the subpairs of wires is electrically connected to a corresponding terminal on the spool.

20 Claims, 1 Drawing Sheet

TELECOMMUNICATIONS LINE TEST EXTENSION APPARATUS

TECHNICAL FIELD OF THE INVENTION

This invention relates to equipment for testing telecommunications lines.

BACKGROUND OF THE INVENTION

Long spans of copper wires used for T1, Integrated Services Digital Network (ISDN) and other telecommunications purposes often include repeaters designed to boost the signal traveling through the wires. When a problem is reported in the line, a technician often must descend into a manhole in order to access an apparatus case that houses a repeater. Such access may involve inserting a test adapter into a slot in the apparatus case. A conventional test adapter includes a series of receptors for a bantam plug mounted on one end of a ten foot long cord. The opposite end of the cord normally has a pair of alligator clips for connection to a variety of devices used to diagnose the problem in the line.

One problem that arises from this arrangement is that the technician often uses multiple diagnostic devices, and the technician must ascend from the manhole to retrieve each successive device from the service vehicle. Another problem with the conventional approach is that the diagnostic devices themselves are exposed to a particularly harsh environment in the manhole. Still another problem that confronts the technicians is that cellular telephone reception in manholes is often poor or nonexistent, hampering their ability to communicate with a central office.

BRIEF DESCRIPTION OF THE DRAWINGS

The objects, features and advantages of the present invention are readily apparent from the following detailed description of the best mode for carrying out the invention when taken in conjunction with the accompanying drawings, in which.

DETAILED DESCRIPTION OF THE PRESENTLY PREFERRED EMBODIMENT(S)

Figure 1:
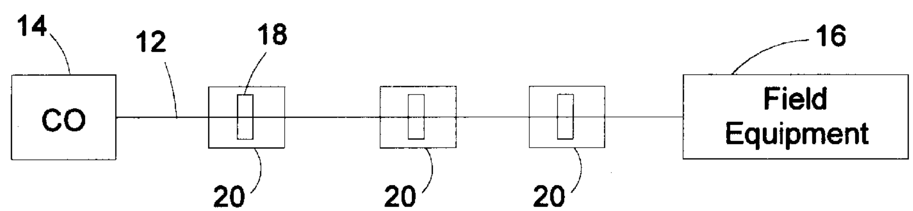
FIG. 1 is a schematic representation of a telecommunications network including a series of access cases.

FIG. 1 schematically depicts a telecommunications network 10 including relatively long spans 12 of copper wires that extend from a central office 14 toward a field side 16. The spans 12 may comprise segments of T1, ISDN or other telecommunications lines that include repeaters 18 for amplifying voice or data signals traveling through the lines. The repeaters 18 are mounted in slots in access cases 20.

The spans 12 are often buried underground such that the only physical access to the lines in through manholes. The repeaters 18 are normally situated in the manholes. In order to locate the source of a problem in the line, a repeater must be removed from its slot in the access case 20 and replaced with an adapter. Various test devices can then be connected to the line in order to send electrical signals either toward test centers in communication with the central office 14, or toward telephones or other telecommunications equipment on the field side 16.

Figure 2:
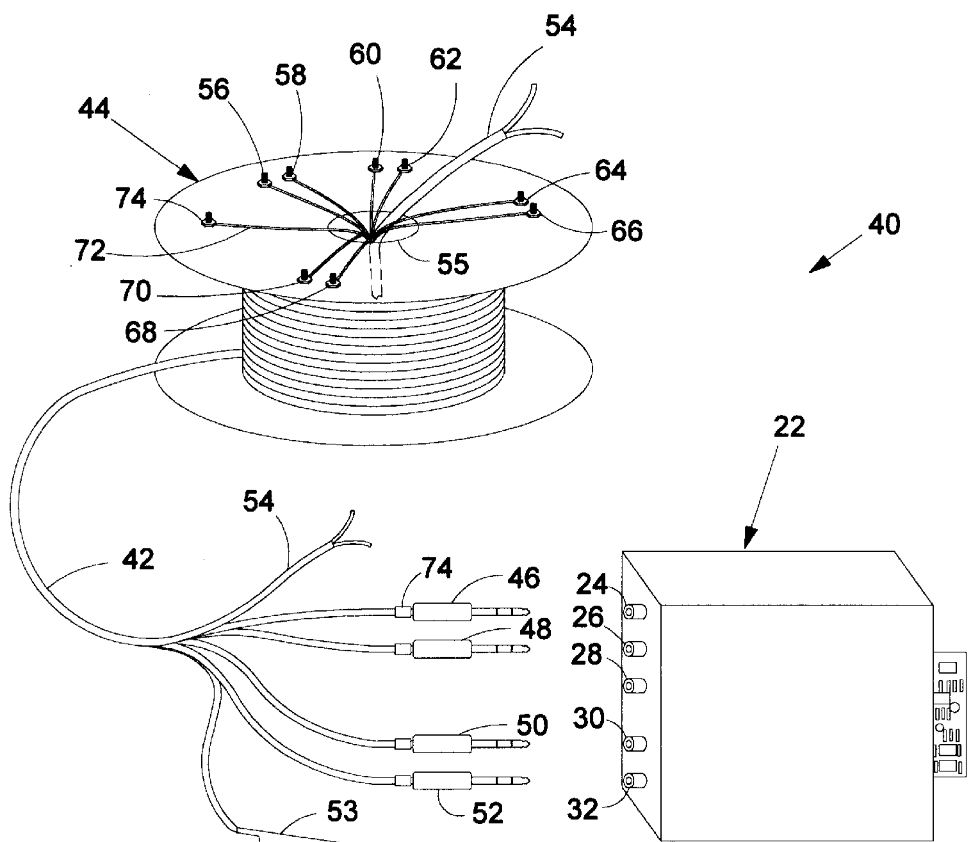
FIG. 2 is a perspective view of one embodiment of a test extension apparatus for use in diagnosing problems with the telecommunications network.

FIG. 2 shows a typical test adapter 22, which includes bantam plug receptors 24, 26, 28, 30 and 32. The receptors 24 and 26 represent the transmit and receive sides, respectively, of a circuit toward the central office 14. The receptors 30 and 32 represent the transmit and receive sides, respectively, of a circuit toward the field side 16 of the line. The receptor 28 is normally grounded.

A test extension apparatus 40 includes an extended length of six-pair JK house wire 42 wound on a spool 44. At the free end of the wire 42, four of the six pairs are electrically connected to bantam plugs 46, 48, 50 and 52. A fifth pair of the wire 42 is electrically connected to an alligator clip 53 normally used for ground. The sixth pair 54 of the wire 42 is stripped for use with a communications headset, as described below.

The wire 42 is wound on the spool 44, and the end of the wire 42 opposite the bantam plugs is fed up through a center 55 of the spool. One pair of the wire 42 is electrically connected to positive and negative terminals 56 and 58, respectively. A second pair of the wire 42 is electrically connected to positive and negative terminals 60 and 62, respectively. Third and fourth pairs of the wire 42 are similarly connected to terminals 64, 66, 68 and 70. A ground wire 72 is electrically connected to a terminal 74. The terminals are simply formed, in a preferred embodiment, by three-quarter inch bolts inserted through one side of the spool 44 proximate its periphery and retained by washers and nuts.

The wire pairs are provided with a conventional color-coding scheme. Thus, the wire leading to the positive terminal 56 may be blue, while the wires leading to the positive terminals 60, 64 and 68 may be respectively orange, green and brown. The wires leading to the negative terminals 58, 62, 66 and 70 are generally all white. In the absence of color-coding, the terminals on the spool 44 may be provided with some identifying indicia such as colors or alphanumeric characters.

The bantam plugs 46, 48, 50 and 52 are respectively insertable into the receptor 24, 26, 30 and 32 on the adapter 22. The bantam plugs are also preferably provided with identifying indicia to indicate their correspondence with the terminals on the spool 44. In one embodiment, locations near the bantam plugs 46, 48, 50 and 52 are respectively provided with blue, orange, green and brown tie wraps or tape 74.

A technician making a service call can leave the spool 44 in or near his service vehicle, and descend once into the manhole to insert the adapter 22 into the access case 20. The technician can then connect any diagnostic equipment, such as a time domain reflectometer (TDR), to the proper send/receive and central office/field side terminals on the spool 44. Successive pieces of diagnostic equipment, if required, are easily and quickly connectable to the terminals on the spool 44 in place of the preceding piece of equipment without having to descend into the manhole.

The technician in the service vehicle can simultaneously communicate with a partner in the manhole through the sixth pair 54 of the wire 42. In a preferred embodiment, both parties electrically connect headsets to their respective ends of the communication wires 54, and one of the parties connects a nine-volt battery to the circuit to provide power. At the same time, the technician in the service vehicle has unimpeded access to communications with the central office 14, either through on-board radios or through conventional cellular communications.

Systems incorporating the teachings of the present invention thus reduce the number of trips down into the manhole that previous systems required. Moreover, the diagnostic devices themselves are not exposed to the sometimes damaging environment in the manhole. Finally, communications between technicians at the repair site is improved, as are communications between the repair site and the central office.

While specific embodiments of the present invention have been shown and described, it will be apparent to those skilled in the art that the disclosed invention may be modified in numerous ways and may assume many embodiments other than those specifically set out and described above. Accordingly, the scope of the invention is indicated in the appended claims, and all changes that come within the meaning and range of equivalents are intended to be embraced therein.

What is claimed is:

1. An apparatus for testing a communications line, the apparatus comprising:

a spool having at least eight terminals;

a length of wire wound on the spool, the wire having at least four subpairs of wires; and each of the subpairs of wires having opposite ends, a first end of each of the subpairs of wires being electrically connectable to the communications line, and a second end of each of the subpairs of wires being electrically connected to a corresponding terminal on the spool.

2. The apparatus of claim 1 wherein the wire further comprises a fifth subpair of wires having a first end connectable to an electrical ground, and a second end electrically connectable to a ninth terminal on the spool.

3. The apparatus of claim 1 wherein the wire further comprises a sixth subpair of wires adapted for communications between locations proximate the first end of each of the subpairs of wires and the second end of each of the subpairs of wires.

4. The apparatus of claim 1 wherein the terminals comprise bolts extending through a side of the spool proximate a periphery of the side.

5. The apparatus of claim 1 wherein the first end of each of the subpairs of wires is provided with an identifier, and the second end of at least one wire of each of the subpairs of wires is provided with a corresponding identifier.

6. The apparatus of claim 5 wherein the identifier comprises a color.

7. The apparatus of claim 1 further comprising a bantam plug connected to the first end of each of the subpairs of wires.

8. An apparatus for testing a communications line accessible through a manhole, the apparatus comprising:

a spool having at least eight terminals; and a wire wound on the spool, the wire having a length sufficient to extend from the communications line to a location outside of the manhole, the wire having at least four subpairs of wires; and each of the subpairs of wires having opposite ends, a first end of each of the subpairs of wires being electrically connectable to the communications line, and a second end of each of the subpairs of wires being electrically connected to a corresponding terminal on the spool.

9. The apparatus of claim 8 wherein the wire further comprises a fifth subpair of wires having a first end connectable to an electrical ground, and a second end electrically connectable to a ninth terminal on the spool.

10. The apparatus of claim 8 wherein the wire further comprises a sixth subpair of wires adapted for communications between locations proximate the first end of each of the subpairs of wires and the second end of each of the subpairs of wires.

11. The apparatus of claim 8 wherein the terminals comprise bolts extending through a side of the spool proximate a periphery of the side.

12. The apparatus of claim 8 wherein the first end of each of the subpairs of wires is provided with an identifier, and the second end of at least one wire of each of the subpairs of wires is provided with a corresponding identifier.

13. The apparatus of claim 12 wherein the identifier comprises a color.

14. The apparatus of claim 8 further comprising a bantam plug connected to the first end of each of the subpairs of wires.

15. An apparatus for testing a communications line accessible through a manhole, the apparatus comprising:

a spool having a center and at least eight terminals;

a wire wound on the spool, the wire having a length sufficient to extend from the communications line to a location outside of the manhole, the wire having at least four subpairs of wires; and each of the subpairs of wires having opposite ends, a first end of each of the subpairs of wires being electrically connectable to the communications line, and a second end of each of the subpairs of wires extending through the center of the spool and being electrically connected to a corresponding terminal on the spool.

16. The apparatus of claim 15 wherein the wire further comprises a fifth subpair of wires having a first end connectable to an electrical ground, and a second end electrically connectable to a ninth terminal on the spool.

17. The apparatus of claim 15 wherein the wire further comprises a sixth subpair of wires adapted for communications between locations proximate the first end of each of the subpairs of wires and the second end of each of the subpairs of wires.

18. The apparatus of claim 15 wherein the terminals comprise bolts extending through a side of the spool proximate a periphery of the side.

19. The apparatus of claim 15 wherein the first end of each of the subpairs of wires is provided with an identifier, and the second end of at least one wire of each of the subpairs of wires is provided with a corresponding identifier.

20. The apparatus of claim 19 wherein the identifier comprises a color.

* * * * *